United States Patent [19]

Caldwell et al.

[11] 4,133,669

[45] Jan. 9, 1979

[54] PROCESS FOR PELLETIZING A SULPHUR-BENTONITE CLAY MIXTURE AND THE PRODUCT FORMED THEREBY

[75] Inventors: Bob L. Caldwell, Big Sandy, Tex.; Ronald B. Fletcher, Calgary, Canada

[73] Assignees: Agri-Prassco Joint Venture, Calgary, Canada; Agri-Sul Equipment, Mineola, Tex. ; part interest to each

[21] Appl. No.: 789,094

[22] Filed: Apr. 20, 1977

[51] Int. Cl.² ................................................ C05G 3/04
[52] U.S. Cl. ............................................. 71/3; 71/54; 71/62; 71/64 E; 71/DIG. 1; 106/287.32
[58] Field of Search ...................... 71/1, 11, 27, 31, 32, 71/54, 62, 64 E, 64 F, 64 C, 64 G, 64 SC, 64 DC, 64 DB, DIG. 1; 106/DIG. 4, 287 SC, 287 SS; 423/567, 275; 23/308 S, 293 S, 267 S

[56] References Cited

U.S. PATENT DOCUMENTS

| | | | |
|---|---|---|---|
| 1,378,084 | 5/1921 | Bacon et al. | 23/308 S X |
| 3,125,434 | 3/1964 | Smith et al. | 71/64 E X |
| 3,325,276 | 6/1967 | Feller et al. | 71/64 E |
| 3,840,232 | 10/1974 | Ludwig et al. | 106/287 SC |

FOREIGN PATENT DOCUMENTS 859612 12/1970 Canada .................................... 423/567

*Primary Examiner*—Ferris H. Lander
*Attorney, Agent, or Firm*—Lerner, David, Littenberg & Samuel

[57] ABSTRACT

A process for pelletizing a mixture of elemental sulphur and bentonite clay to produce a water degradable prill includes adding dry clay dust to molten sulphur at an elevated temperature to provide a molten sulphur-clay mixture, forming droplets of the mixture, providing a liquid fertilizer coolant at a temperature lower than the freezing temperature of the sulphur-bentonite mixture, feeding the droplets into the coolant, passing the droplets through the coolant for a time sufficient to anneal the droplets into pellets, and removing the annealed pellets from the coolant.

13 Claims, 1 Drawing Figure

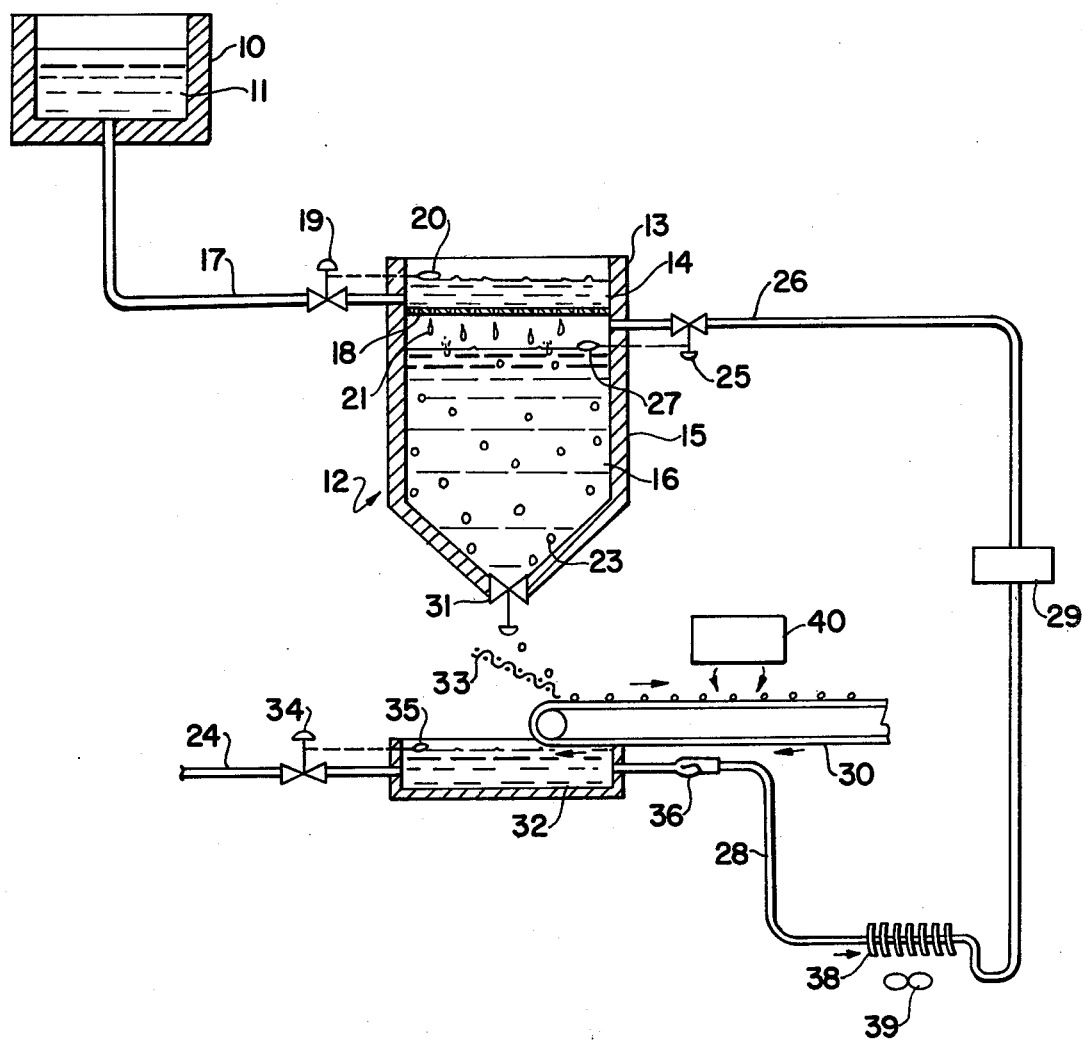

PROCESS FOR PELLETIZING A SULPHUR-BENTONITE CLAY MIXTURE AND THE PRODUCT FORMED THEREBY

BACKGROUND OF THE INVENTION

This invention relates to the manufacture of a water degradable sulphur fertilizer and, more particularly, to a process for preparing solid dust-free pellets of such fertilizer and the product formed by such process.

The importance of sulphur as a soil additive, either in the form of sulphur compounds or in its elemental form, with or without a medium such as mineral clay, suspended therein, has been widely understood in the literature for some time. It is important that the elemental sulphur, as a soil additive, be in a finely divided form. In this form it may be stabilized with suspensions therein of certain mineral clays, such as bentonite.

A particularly successful method for preparing such a product is described in U.S. patent application Ser. No. 683,900, filed May 11, 1976, by Bob L. Caldwell, and entitled "GRANULAR SULPHUR-BENTONITE MIXTURE FOR FERTILIZER AND METHOD OF PREPARING SAME." The product manufactured by that process, under the trademark AGRI-SUL, has enjoyed great commercial success. The process described in the aforementioned application comprises the steps of adding one to three parts (out of ten parts) of substantially dry clay dust to seven to nine parts of molten sulphur, with continuous and thorough mixing, at an elevated temperature between 240° and 300° F., pouring the uniform mixture onto a moving wet stainless steel belt, allowing the mixture to cool to a thickness of one-quarter to one-half inch, curing the cooled mixture, comminuting the mixture and screening and separating the granules having a particle size of $-6/+16$ mesh on the U.S. standard scale. While such a process results in a highly satisfactory product that has become widely recognized as a desirable soil additive, such process does suffer from several drawbacks. First, the product prepared by such process tends to produce a quantity of dust, both during the manufacture of the product and in the end product itself. Second, because of the dust and the subsequent risk of explosion thereof, it is desirable to provide an inert gas atmosphere during manufacture.

It is therefore an object of the present invention to provide an improved manufacturing process for a water degradable sulphur-bentonite mixture.

One method for producing a more desirable product form would be to form solid dust-free pellets, or prills, of the sulphur-bentonite mixture. It is well known that sulphur can be prilled using water as a cooling agent. An apparatus and a process for pelletizing elemental sulphur is described in U.S. patent application Ser. No. 669,023, filed Mar. 22, 1976 now U.S. Pat. No. 4,052,136, Oct. 4, 1977. by Ronald B. Fletcher, and entitled "SULPHUR PELLETIZING PROCESS AND APPARATUS." This last-mentioned patent application discloses a process which includes the steps of forming droplets of molten sulphur and passing the droplets through a liquid cooling medium, preferably water, at a temperature range wherein annealing of the sulphur will occur. Although the solid prills are dust-free and the manufacturing process is also dust-free, since the desired sulphur-bentonite mixture is water degradable, the aforedescribed prilling process and apparatus has been found to be wanting because the sulphur-bentonite mixture does not pelletize in the water, but rather degrades.

It is therefore a further object of this invention to provide an improved process for forming prills from a sulphur-bentonite mixture.

SUMMARY OF THE INVENTION

The foregoing and additional objects are attained in accordance with the principles of this invention by providing a process for the manufacture of solid pellets of a water degradable solid suspension of bentonite clay in elemental sulphur, comprising the steps of adding one to three parts (out of ten parts) of substantially dry clay dust to seven to nine parts of molten sulphur with continuous and thorough mixing in a mix tank at an elevated temperature between about 238° F. and about 300° F., forming droplets of the mixture, providing a liquid fertilizer solution, feeding the droplets into the liquid fertilizer solution, passing the droplets through the liquid fertilizer solution for a time sufficient to anneal the droplets into pellets, and removing the pellets from the liquid fertilizer solution.

DESCRIPTION OF THE DRAWING

The foregoing will be more readily apparent upon reading the following description in conjunction with the drawing in which the single FIGURE is a schematic diagram of preferred apparatus shown in vertical section with which the process according to the principles of this invention may be practiced.

DESCRIPTION OF THE PREFERRED EMBODIMENT

Referring now to the drawing, shown therein is preferred apparatus with which the process in accordance with the principles of this invention may be practiced. The apparatus includes a mix tank 10 heated by steam tracer lines to an elevated temperature between about 238° F. and about 300° F. Preferably, the elevated temperature range is between about 238° F. and about 280° F., and more preferably the temperature is about 245° F. In accordance with the disclosure of the aforementioned Caldwell patent application, seven to nine parts (out of ten parts) of molten sulphur is added to mix tank 10. One to three parts of dry lattice expanding type bentonite clay "type 325" having a moisture content of less than five percent is added to the molten sulphur. A mixture 11 is thus formed. The clay is added in dust form and is mixed slowly, to eliminate balling up of the clay. The moisture content of the clay should be kept to a minimum, to eliminate boiling over in the mix tank. The degradable characteristic of the resultant sulphur-bentonite prills can be varied by increasing or decreasing the ratio of clay that is added to the sulphur. To generalize, larger amounts of clay will cause sulphur to degrade faster. (In the present context, degrading means to reduce to smaller particles.)

Mixture 11 in mix tank 10 must be maintained at the elevated temperature, preferably between about 238° F. and 280° F., under continuous agitation, as a lower temperature will result in the sulphur salting out and higher temperatures will retard the water degradability of the sulphur. Without agitation, the clay will salt out. The bentonite clay used in this process should preferably have a moisture content of less than five percent. The size of the clay dust should be such that between about 95 percent and 98 percent will pass through a 200 mesh U.S. standard screen. The swelling capability of the clay should be in a range from about 15 to about 20 times. Small amounts of soda ash can be added to the clay to increase its swelling capability, with the result being that the soda ash will help speed up the water degrading time of the sulphur clay mixture.

To form the solid pellets, or prills, of the sulphur-bentonite mixture, the mixture is fed to a pelletizing vessel 12, of the type disclosed in the aforementioned Fletcher patent application. Pelletizing vessel 12 is divided into a molten mixture chamber 13 and an annealing chamber 15 by a perforated plate 18. The molten sulphur-bentonite mixture is fed into chamber 13 through feedline 17, its flow being regulated by valve 19 which is controlled by float 20. A substantially constant "head" of the molten mixture 14 is thereby provided in molten mixture chamber 13. The temperature of the molten sulphur-bentonite mixture is maintained in the range from about 238° F. to about 280° F. Heating means such as electric heating coils may be provided in plate 18 to inhibit freezing of the sulphur-bentonite mixture in the perforations. However, heating of the plate is not essential and would only be beneficial during start-up, as heat from the molten sulphur-bentonite mixture is sufficient to prevent unwanted freezing in the perforations.

Annealing chamber 15 is provided with a supply of liquid cooling medium 16. In accordance with the principles of this invention, liquid cooling medium 16 comprises liquid fertilizer. If the liquid cooling medium was water, or contained an excessive amount of water, as discussed above the sulphur-bentonite mixture would not become pelletized, but would degrade, turning into a "mush" as the mixture entered the water.

The coolant is supplied to chamber 15 through inlet valve 25, its level being regulated by float 27. The temperature of the coolant is maintained in a range preferably between about 50° F. to about 120° F. The temperature range of the coolant is controlled by heat exchanger 38, in a manner to be described hereinafter.

To form the sulphur-bentonite prills, the sulphur-bentonite mixture passes through perforations in plate 18 to from droplets 21 which fall into coolant 16. Coolant 16 forms a cooling zone and, as the droplets pass through this cooling zone, they are annealed into hard smooth pellets 23 by the time they reach the bottom of pelletizing vessel 12. At the bottom of vessel 12, there is provided a rotary outlet valve 31 for discharging effluent coolant and annealed sulphur-bentonite pellets. Immediately below outlet valve 31, screen 33 separates pellets and coolant. The pellets are conveyed by endless belt conveyor 30 to a storage area.

As the pellets are conveyed by endless belt conveyor 30, they pass warm air dryer 40. Warm air dryer 40 includes a source of heat, a heat exchanger, and air circulating means, such as a fan, to blow air over the heat exchanger and onto the pellets on endless belt conveyor 30. Any suitable components may be utilized for warm air dryer 40 and as the details of warm air dryer 40, per se, do not form a part of this invention, such details are omitted from this description. However, warm air dryer 40 should furnish warm dry air to be blown over the pellets as warm moist air would cause premature degradation thereof.

Effluent coolant, having passed through screen 33, is collected in reservoir 32. Loss of coolant through evaporation, is made up by supplying fresh coolant through line 24, the supply being controlled by inlet valve 34 in cooperation with float 35. Coolant is circulated from reservoir 32 along line 28, by pumping means such as impeller pump 36, into heat exchanger 38. Air circulating means, such as a fan 39, drives air upwardly over heat exchanger 38 to effect cooling of the coolant to the desired temperature range. Cooled coolant exiting from heat exchanger 38 continues along line 26 through filter 29 into annealing chamber 15, as described above. The purpose of filter 29 is to remove fines and traces of clay from the coolant.

The most desired size of the prills is the range of Tyler screen sizes from −6 to +16. Three factors determine the prill size. These factors are the pressure forcing the sulphur-bentonite mixture through the perforations in plate 18, the perforation size in plate 18, and the temperature of the molten sulphur-bentonite mixture. The preferred temperature range has been discussed above. The preferred pressure range is attained by adjusting float 20 to provide a liquid "head" in chamber 13 from about ½ inch to about 2 inches. The preferred perforation size is in the range of from about 4/64 to 12/64 inch diameter.

In the aforedescribed process, the free fall distance between plate 18 and the surface of coolant 16 should be maintained at a minimum. The preferable range of free fall distance is from about ¼ inch to about 4 inches.

As mentioned above, the degradable characteristic of the sulphur-bentonite prills can be varied by increasing or decreasing the ratio of clay that is added to the sulphur. Additionally, the concentration of the nitrogen in the liquid fertilizer solution used as the coolant will affect the degradable characteristics of the prills. Higher concentrations of liquid fertilizer solution will produce a strong prill necessary for shipping, blending, and will speed up the degrading time. The nitrogen coating (from the liquid fertilizer) on the prills helps retard the escape of dust from the prills during handling and storage. The nitrogen content is controlled by the amount of liquid fertilizer solution that adheres to the prill while it is being cooled. The ratios of sulphur and nitrogen can be varied to obtain different analyses of nitrogen and sulphur by using higher concentrations of liquid fertilizer solution to increase the nitrogen ratio or by leaving the prills in the liquid fertilizer solution coolant longer, allowing more nitrogen to adhere to the prill. For example, utilizing a 28-0-0 liquid fertilizer solution, the nitrogen content is approximately one-half percent.

It has been found that a 10-34-0 liquid fertilizer solution as coolant yields a desirable end product. The phosphate content of this solution provides a fire retardant coating on the pellets. While the 10-34-0 liquid fertilizer solution has been found to be a preferred coolant, other grades of liquid fertilizer as coolant also yield satisfactory results. For example, a 28-0-0 solution is also a preferred coolant. It is apparent that other grades of liquid fertilizer may be utilized without departing from the scope of this invention.

As discussed above, when the prills are removed from the coolant, they are dried before being stored. The length of time that it takes to dry the prills also affects the degradability of the end product. If the prills are dried quickly, they will degrade faster. When the prills leave endless belt conveyor 30, they may still be slightly damp and may tend to stick together when damp. If this creates a problem, the prills can be coated with an anti-caking clay before storage.

The aforedescribed prilling process for making water-degradable elemental sulphur prills can be varied by also adding any micro-nutrients, such as iron, zinc, etc., mixed with the sulphur.

Accordingly, there has been described an improved process for the manufacture of a water-degradable elemental sulphur product, which product is essentially dust-free and has good degradation characteristics when exposed to moisture in the soil. Although this invention has been disclosed with reference to a preferred embodiment, numerous other variations, modifications and adaptations of the present invention will be apparent to those skilled in the art and such as come within the spirit and scope of the appended claims are considered to be embraced by the present invention.

What is claimed is

1. A process for the manufacture of solid pellets of a water-degradable solid suspension of bentonite clay in elemental sulphur, comprising the steps of:
    adding one to three parts (out of ten parts) of substantially dry clay dust to seven to nine parts of molten sulphur with continuous and thorough mixing in a mix-tank at an elevated temperature between 238° F. and 300° F.;
    forming droplets of the mixture;
    providing a nitrogen containing liquid fertilizer solution, said solution containing a non-degrading amount of water;
    feeding said droplets into said liquid fertilizer soltuion;
    passing said droplets through said liquid fertilizer solution for a time sufficient to anneal the droplets into pellets; and
    removing said annealed pellets from said liquid fertilizer solution.

2. The process according to claim 1 wherein said liquid fertilizer solution is maintained at a temperature range from above about 50° F. up to about 120° F.

3. The process according to claim 1 further including the step of drying the pellets with warm dry air after removal from the liquid fertilizer solution.

4. The process according to claim 3 further including the step of coating the pellets with an anti-caking clay after the pellets are dried.

5. The process according to claim 1 wherein the droplet forming step includes providing a plate having perforations therethrough.

6. The process according to claim 5 wherein the size of said perforations is in the range from about 4/64 inch to about 12/64 inch.

7. The process according to claim 5 wherein the droplet forming step further includes providing a substantially constant head of said mixture above said plate.

8. The process according to claim 7 wherein said head is in the range from about one-half inch up to about two inches.

9. The process according to claim 1 wherein the droplet feeding step includes allowing the droplets to freely fall from said plate to said liquid fertilizer solution.

10. The process according to claim 9 wherein the free fall distance is in the range from about one-half inch up to about four inches.

11. The process according to claim 1 wherein said liquid fertilizer solution is a 10-34-0 grade liquid fertilizer.

12. The process according to claim 1 wherein said liquid fertilizer solution is a 28-0-0 grade liquid fertilizer.

13. A water-degradable solid pellet product comprising a solid suspension of one to three parts (out of ten parts) of bentonite clay in elemental sulphur, whenever prepared by the process of claim 1.

* * * * *